United States Patent
McGraw

[19]

[11] Patent Number: 5,960,157
[45] Date of Patent: Sep. 28, 1999

[54] RECREATIONAL VEHICLE WATER HEATER HAVING CENTRALLY CONTROLLED GAS AND ELECTRIC POWER SOURCES

[75] Inventor: John F. McGraw, Rockford, Ill.

[73] Assignee: Atwood Mobile Products, Inc., Rockford, Ill.

[21] Appl. No.: 08/977,919

[22] Filed: Nov. 25, 1997

[51] Int. Cl.⁶ ............................................. F24C 1/00
[52] U.S. Cl. ................................ 392/308; 392/441
[58] Field of Search ........................... 392/308, 441, 392/444, 447, 449–454; 432/94; 126/361, 362, 344; 219/476, 202; 122/13.1, 13.2

[56] References Cited

U.S. PATENT DOCUMENTS

| | | | |
|---|---|---|---|
| 4,893,610 | 1/1990 | Kang | 126/361 |
| 5,632,614 | 5/1997 | Consadori et al. | 431/79 |

FOREIGN PATENT DOCUMENTS

| | | |
|---|---|---|
| 239267 | 6/1960 | Australia . |
| 56100 | 7/1982 | European Pat. Off. . |
| 61410 | 9/1982 | European Pat. Off. . |
| 2511126 | 2/1983 | France . |
| 2550613 | 2/1985 | France . |
| 2576092 | 7/1986 | France . |
| 281134 | 8/1934 | Italy . |
| 4-268161 | 9/1992 | Japan . |
| 1171651 | 8/1985 | U.S.S.R. . |

*Primary Examiner*—Teresa Walberg
*Assistant Examiner*—Quang Van
*Attorney, Agent, or Firm*—Banner & Witcoff, Ltd

[57] ABSTRACT

A water heater for a recreational vehicle which employs both gas and electric powered system for heating the water within the water heater, wherein both the gas powered and electric powered systems are controlled through a single user interface control. The present invention provides a water heater for a recreational vehicle wherein a hot surface ignition system is used in conjunction with the gas burner and the electric resistance coil is immersed within the water such that either gas stored on board the recreational vehicle, or land-based electrical power can be used to heat the water either independently or in combination. Through the use of a single temperature sensor, and a single operator control, the water can be most efficiently brought up to the appropriate temperature in the most convenient manner for the user. Moreover, the present invention includes a built-in safety system, which does not require a separate energy cut-off switch, to insure that the water within the tank will not rise above an unacceptably safe temperature.

20 Claims, 4 Drawing Sheets

RECREATIONAL VEHICLE WATER HEATER HAVING CENTRALLY CONTROLLED GAS AND ELECTRIC POWER SOURCES

FIELD OF THE INVENTION

The present invention generally relates to water heaters, and more particularly relates to means for controlling the source of powering the water heater.

BACKGROUND OF THE INVENTION

Water heaters, of the type adapted to heat water for the purposes of cooking, bathing, washing, and the like, are typically powered either through the use of a gas flame, or through the use of an electric resistance coil immersed within the water. If gas is used to heat the water, a flame is typically provided outside of the water tank, and the water itself is actually heated by convection as the tank itself is heated and dissipates energy into the water. With electric sources on the other hand, an electric coil having a relatively high resistance factor is immersed within the water tank and by providing electric current through the coil, the resistance causes the coil to become heated to a level sufficient to heat the water.

With respect to gas powered water heaters, such devices have typically required a spark to serve as the ignition means to initially ignite the gas which can then be sustained through a continuous supply of gas or fuel thereto. The spark is typically provided through the use of a pair of conductors which are slightly spaced apart, and by providing electric current through one of the conductors, to a sufficiently high level, the current is caused to "arc" across the gap to the second conductor and thereby provide the spark necessary for ignition of the gas. Once the gas is ignited, the current flow through the conductors can be stopped in that the combustion can be sustained through continuously supplying gas.

With respect to electric immersion coils, a relatively high level of electric power is necessary to cause the resistor to become heated to the level necessary for heating the water within the water heater tank. Typically the water heater requires at least a 120 volt AC power source, which is not a difficulty when the water heater is provided within a land-based home which can be connected to the community electrical grid. However, with mobile homes, or recreational vehicles, the ability to provide sufficient power to heat the water tank, is confronted with a new level of difficulty. The twelve volt DC power typically provided on a recreational vehicle is not sufficient to enable the electric resistance coil to be used.

Various means have therefore been provided as a source of power for the hot water heater on board such recreational vehicles. For example, U.S. Pat. No. 5,632,614, assigned to the present assignee, discloses a gas fired appliance in the form of either a furnace or a hot water heater wherein the ignition means for initially igniting the gas is provided in the form of a "hot surface ignition system" wherein the electric power of the recreational vehicle is sufficient to heat a "hot surface", in the form of a resistor, to a level sufficient to ignite the gas, typically propane. Once ignition is reached, current flow to the hot surface can be stopped in that combustion of the gas can be sustained simply by providing a continuous flow of gas to the hot water heater.

Alternatively, the '614 Patent also discloses the use of an electric coil which can be immersed within the water tank and powered by a land-based power source which is able to deliver the 120 volt AC power which is necessary to heat the electric coil sufficient to heat the water.

While the system disclosed in the '614 patent does provide a means by which two different power sources can be used to heat the water within the water heater, it also requires two entirely separate means of sensing and control. For example, with regard to the gas system, a temperature probe is required to be provided within the hot water heater which in turn sends a signal to a processor wherein the processor then compares the actual temperature to the desired temperature, typically entered into the system through a thermostat. Depending on the difference between the actual water temperature and the desired water temperature, the processor can then send a signal to a valve to turn the flow of gas to the gas burner on or off. If in fact the recreational vehicle is parked and has access to a land-based power system, the electrical coil immersion system can be used either instead of, or in conjunction with, the gas burner. However, the electric coil immersion system also requires a temperature probe provided within the hot water heater, and a control mechanism for providing electrical power to the coil.

As a result of these duel systems, the actual control of the water heater can be a rather cumbersome system resulting in an inefficient manner for heating the water within the hot water heater. The user is forced to set and monitor both the gas and the electric power systems. Moreover, the manufacturer of such recreational vehicles, are forced to make expenditures for the dual means of control which necessarily results in a higher cost for the recreational vehicle.

SUMMARY OF THE INVENTION

It is therefore a primary aim of the present invention to provide a water heater for a recreational vehicle having both a gas powered heater and an electric powered heater, and with a single control by which the user can set the desired water temperature, and then rely on the processor to adequately control the flow of gas and electric to bring the actual water temperature up to the desired water temperature level.

It is an objective of the present invention to provide a water heater which uses both gas and electric as a source of power and which uses a single temperature sensing device as a means of feedback to the processor controlling the gas and electric supplies.

It is another objective of the present invention to provide a water heater for use on recreational vehicles which enables the user to choose the source of power, i.e., gas, electric, or combination thereof, in addition to selecting the desired temperature.

It is another objective of the present invention to provide a water heater for a recreational vehicle which employs a hot surface ignition system for use in conjunction with the gas powered water heater.

In accordance with these aims and objectives, a feature of the present invention is a recreational vehicle water heater comprising a water tank, an electric heating means, a gas heating means, user interface means, a temperature measurement means, and a processor. The tank is adapted to hold water to be heated and includes an inlet for receipt of cold water and an outlet for exhaust of hot water. The electric heating means and the gas heating means are both adapted to heat the water within the tank either independently, or in combination. The user interface means enables a user to input the desired water temperature and the desired means for heating the water and is adapted to generate a signal proportional to the desired water temperature and a signal proportional to the desired heating means. The temperature measurement means is adapted to measure the temperature of the water within a tank and generate a signal proportional thereto which is then fed to the processor. The processor is adapted to receive the desired temperature signal, the desired heating means signal, and the measured temperature signal, and is further adapted to compare the measured temperature signal to the desired temperature signal to thereby generate signals to the electric heating means and the gas heating means or both, depending on the desired heating means signal.

It is another feature of the present invention to provide a recreational vehicle water heater wherein the temperature measurement means is a thermistor disposed within the water, or on the outside surface of the tank.

It is another feature of the present invention to provide a recreational vehicle water heater wherein the user interface means includes a desired heating means switch adapted to allow a user to select a gas heat mode, an electric heat mode, or a combination mode.

It is yet another feature of the present invention to provide a recreational vehicle water heater wherein the inherent characteristics of the thermistor prevent the water temperature from exceeding approximately 140° F. This provides a safety feature against the water reaching a predetermined and unacceptably high level without the need for an energy cut-off switch. More specifically, if the thermistor fails in either an open or short condition, the processor recognizes these conditions and shuts down the water heater. Similarly, if the adjustable potentiometer fails in a short condition the water temperature will not exceed approximately 120° F. If the adjustable potentiometer fails in an open condition, the water temperture will not exceed 140° F. In both conditions, it is the processor that recognizes the failure mode and causes the unit to default at either 120° F. or 140° F.

It is still another feature of the present invention to provide a water heater adapted to be powered either by a gas fuel source, an electric source, or a combination thereof and which includes a single temperature sensing device for monitoring the actual temperature of the water, and a single controller for allowing the user to select a desired water temperature. The controller is adapted to direct the gas fuel source, the electric source, or a combination thereof to cause the actual water temperature to match the desired water temperature.

It is a still further feature of the present invention to provide a method for heating a body of water on board a recreational vehicle using both electric resistance and gas flame, the method employing a single temperature sensor and a single controller in communication with the electric resistance and gas flame, and including the steps of entering the desired water temperature and desired source of heat, sensing the actual water temperature, comparing the actual water temperature to the desired water temperature, and activating the heat output by the electric resistance and/or the gas flame until the desired water temperature is equal to the measured water temperature.

These and other aims, objectives and features of the invention will become more apparent from the following detailed description when taken in conjunction with the accompanying drawings.

Figure 1:
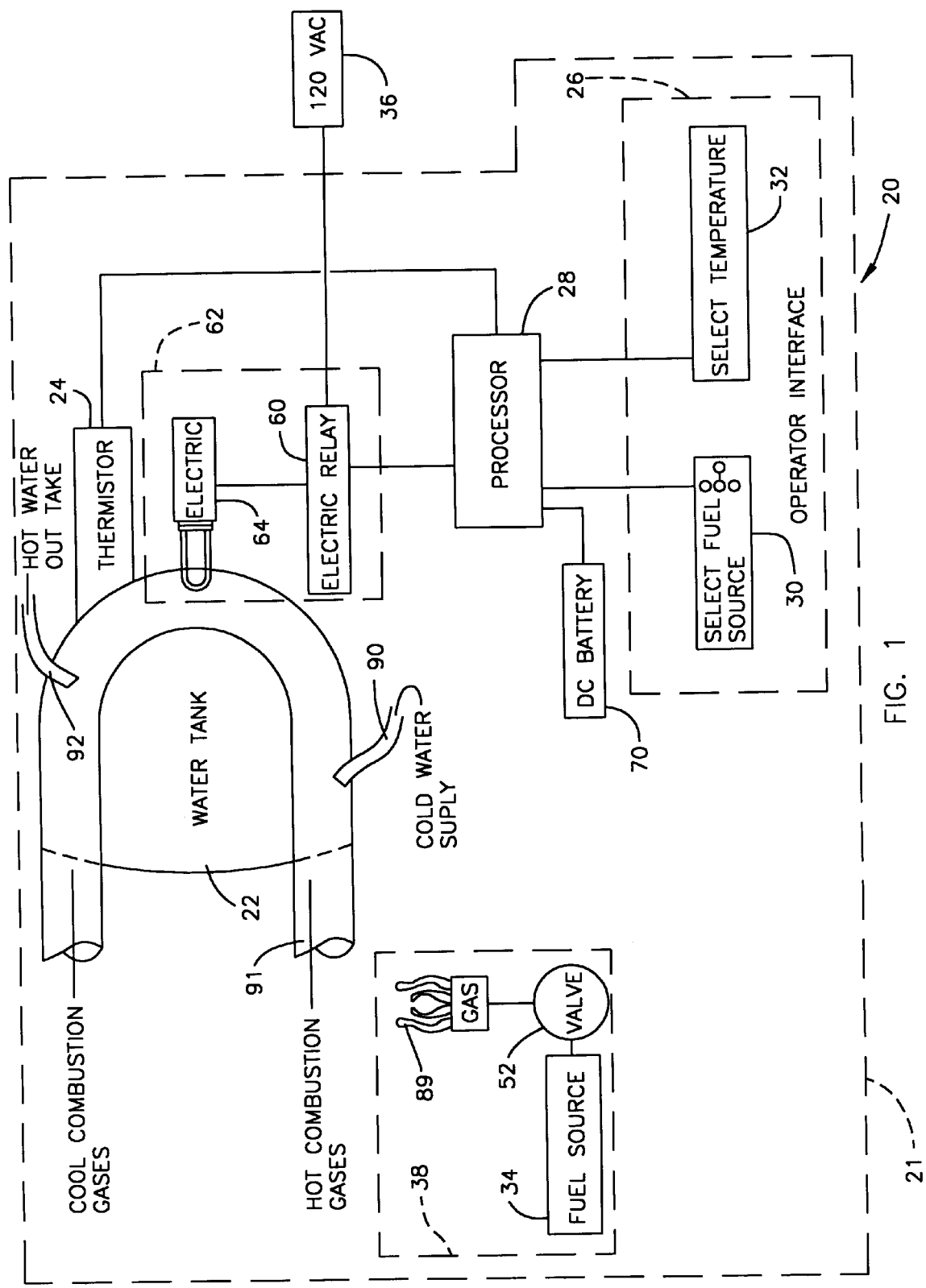
FIG. 1 is a schematic view of the preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, and with specific reference to FIG. 1, the preferred embodiment of the present invention is depicted as water heater system 20. In accordance with the aims and objectives of the present invention, it can be seen that system 20 includes a water tank 22 which can be heated either through gas power or electric power. Moreover, through the use of a single temperature sensor, i.e., thermistor 24 and a single operator interface 26, a user of system 20 can simply select the desired choice of fuel and the desired temperature and system 20 then automatically regulates the heating of water tank 22 to the appropriate temperature using the appropriate fuel. Such a system is in stark contrast to prior art devices, which may be adapted to use either a gas powered or an electric powered water heater, but which require dual systems of temperature monitoring, and dual systems of user interface.

Figure 3:
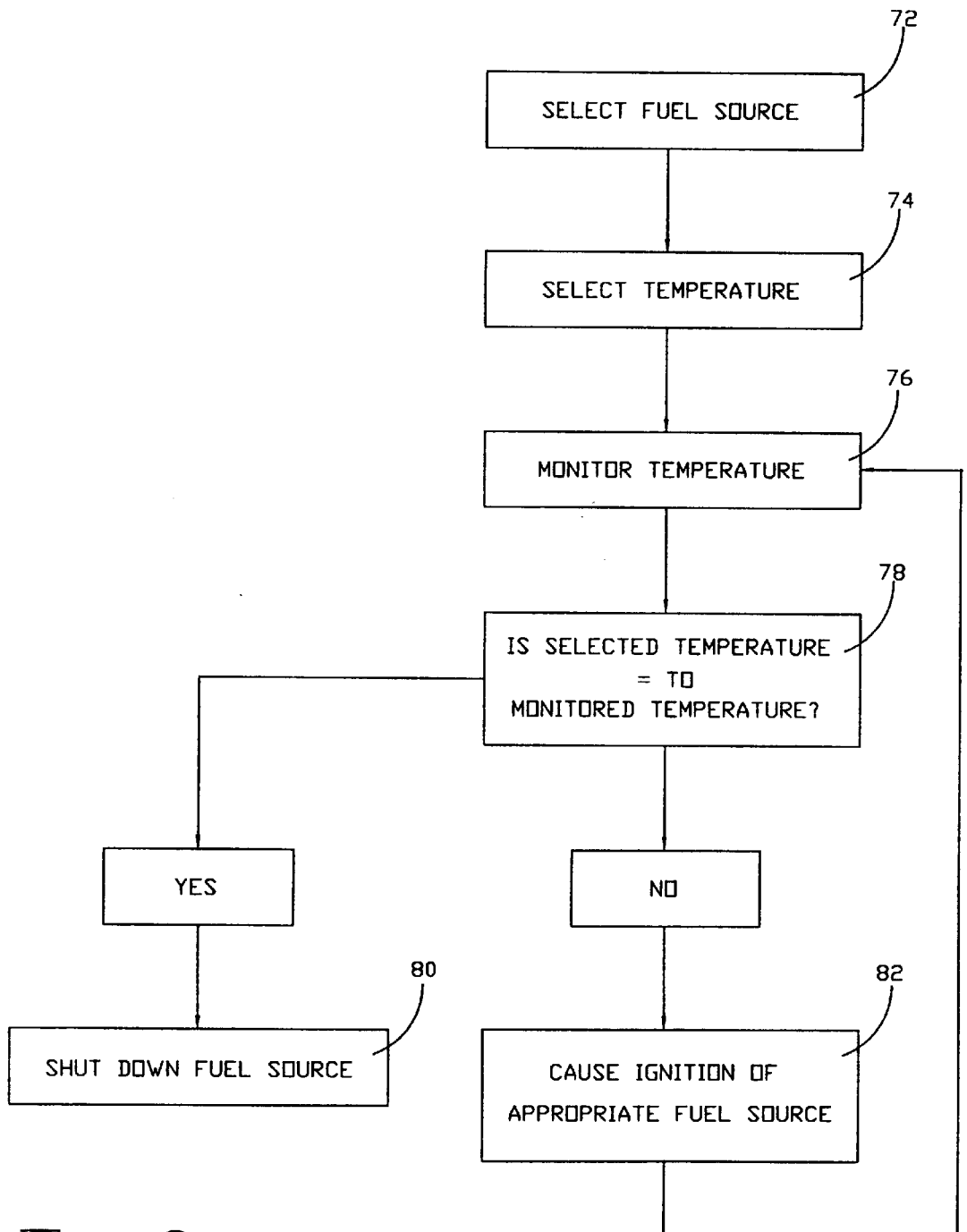
FIG. 3 is a flow chart representation of the steps and decisions made by the processor of the preferred embodiment of the present invention.
Figure 4:
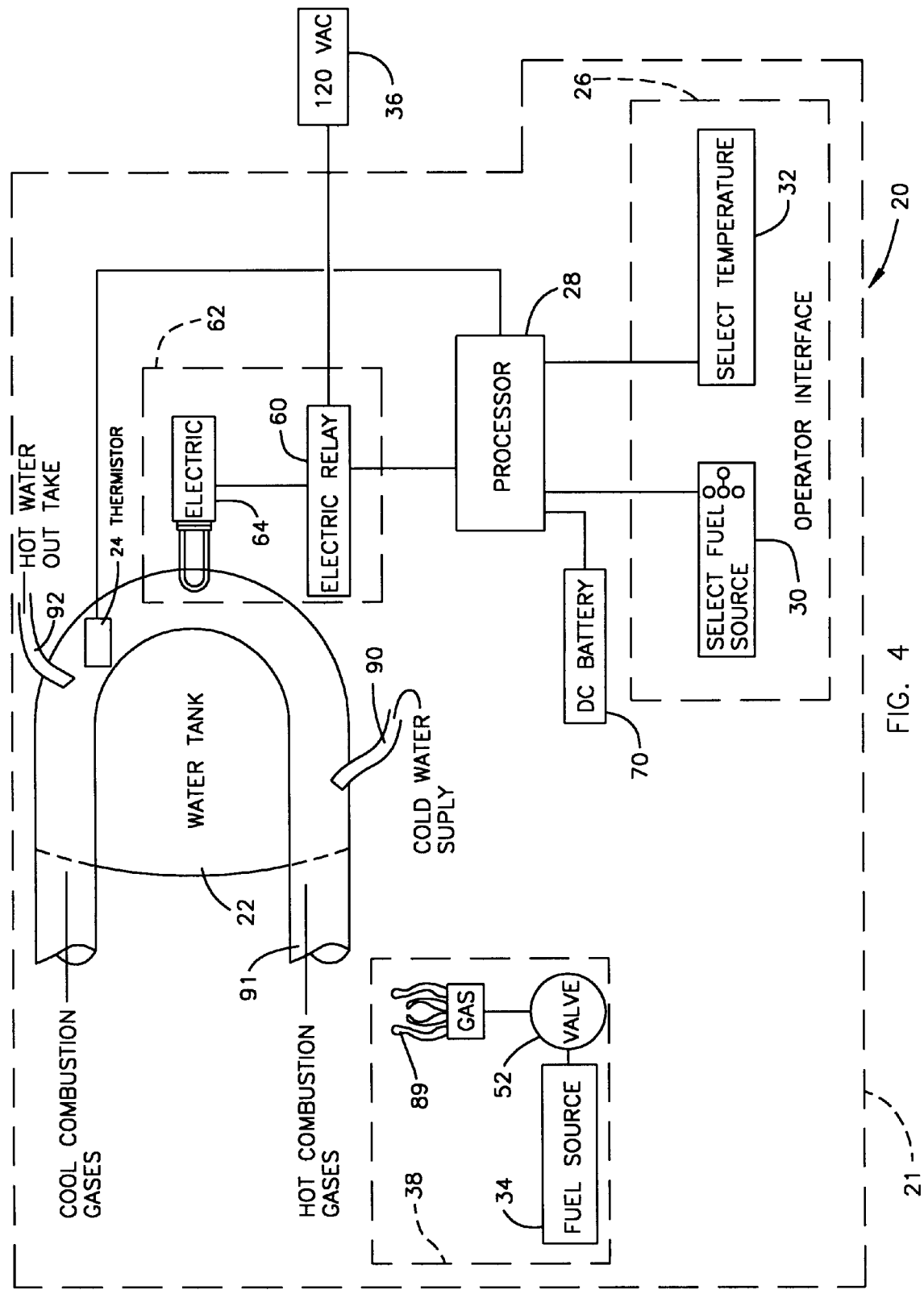
FIG. 4 is a schematic view of an alternative preferred embodiment of the present invention, wherein the thermistor is positioned in the water tank.

The preferred embodiment of the present invention is able to accomplish the foregoing through the use of a computer processor 28. Processor 28 receives signals from operator interface 26 as well as thermistor 24 and based on a series of calculations and choices, determines the most appropriate manner in which to bring water tank 22 to the desired temperature. While the specific software code by which the processor 28 is able to accomplish these objectives is not included herewith as a variety of software code programs could be written to accomplish same, a flow chart showing the basic sequence of decisions is depicted in FIG. 3, and will be described with further detail herein. However, it is important to note, that through the use of processor 28, a central location is provided by which all signals can be received and which can then calculate the best manner for bringing tank 22 up to the appropriate temperature while being relatively transparent to the user in that the user only needs to select the appropriate fuel source and the desired temperature.

As shown in FIG. 1, operator interface 26, in the preferred embodiment, includes means for entering two variables. The two variables to be selected include the desired fuel source and the desired temperature, which as shown in FIG. 1, can be entered into the system through fuel source selection switch 30, and thermostat or potentiometer 32, respectively. Fuel source selection switch 30 actually includes three settings which allow the user to select gas power, electric power, or a combination thereof.

Depending on the location and situation of the user, he or she can select the most appropriate mode of power to bring the temperature of the water tank 22 to the desired level most efficiently and quickly. For example, if water heater system 20 is disposed on a recreational vehicle 21 and the vehicle is in a remote location, access to electric power sufficient to power the water tank, i.e., at least a 120 volt AC power, may not be available. Gas power will then be needed to heat the water tank in which case the user can use fuel source selection switch 30 to select the use of the stored gas 34 on board the vehicle. Conversely, if the vehicle is located next to a land-based power source 36 the user can take advantage of the electric power to thereby heat the water tank 22 either independently, or through the use of a third mode on fuel source selection switch 30, in combination with the gas provided by gas fuel source 34. It can therefore be seen that water heater system 20 actually has three modes of operation which can most efficiently and quickly bring the water within tank 22 to the desired temperature depending on the location and available power sources.

Figure 2:
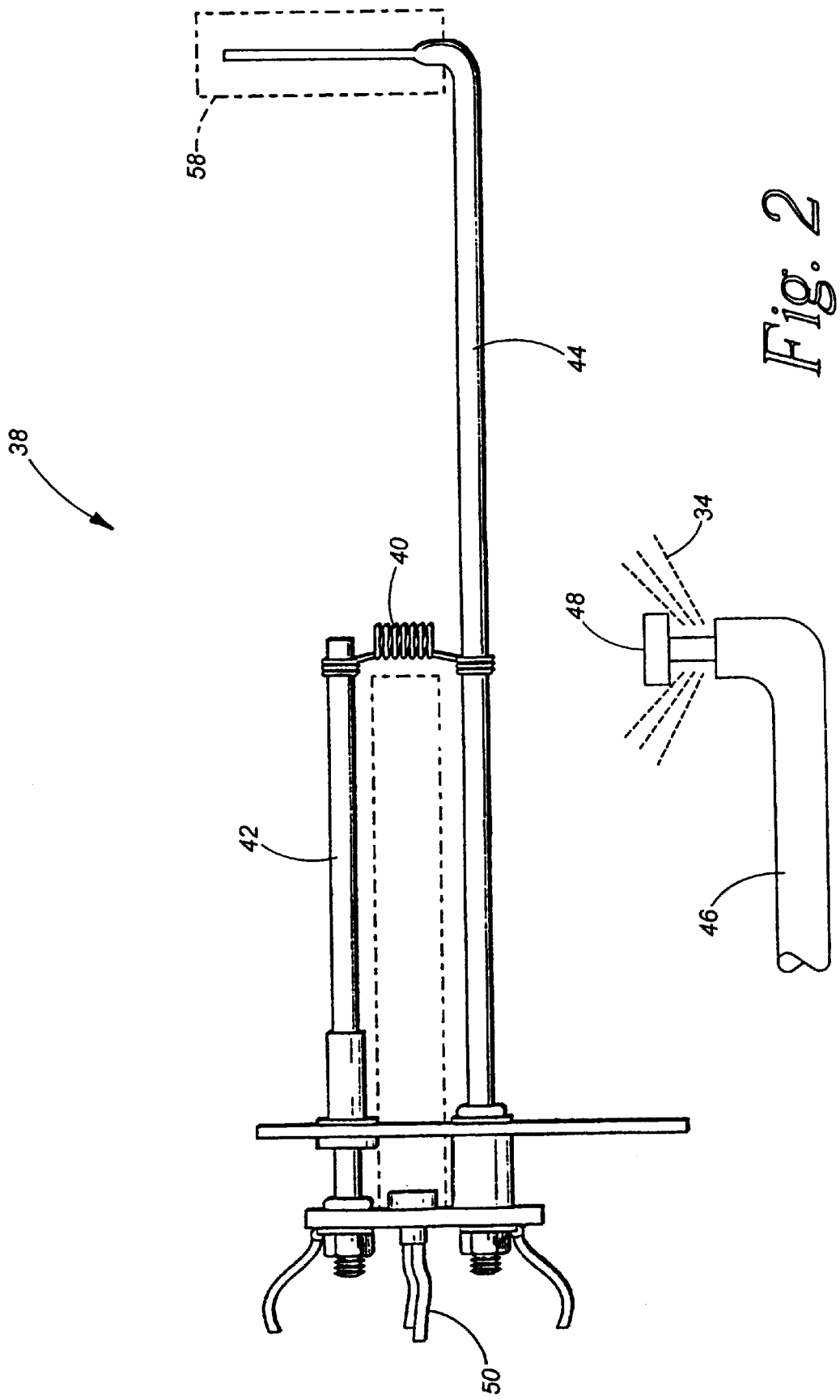
FIG. 2 is a partial perspective and schematic view of the hot surface ignition system of the preferred embodiment of the present invention.

Turning now to the specific system by which gas power is able to heat water tank 22, gas system 38 is shown symbolically in FIG. 1, in its preferred embodiment. As will be readily appreciated by one of ordinary skill in the art, the preferred gas system 38 of the present invention uses the technology disclosed in U.S. Pat. No. 5,632,614, assigned to the present assignee, which disclosure is expressly incorporated by reference herein. By way of summarization, the preferred gas system 38 of the present invention employs a "hot surface" ignition system which is adapted to heat a surface 40 to a temperature sufficient to ignite gas 34 with which it comes into contact. Such a system is in contrast to "spark" ignition systems which require an electric arc to jump between conductors in order to ignite the gas. As best shown in FIG. 2, hot surface 40 in the preferred embodiment, is provided in the form of an electric resistor which is electrically connected between a first conductor 42 and a second conductor 44. By providing electric power through a first conductor 42 and second conductor 44, hot surface 40 is heated as a result of the electric resistance therein. The source of power to heat hot surface 40 can be provided either through a battery provided on the recreational vehicle, or through land-based power system 36.

Once hot surface 40 is brought up to a temperature sufficient to ignite gas 34, gas 34 is directed to flow through conduit 46 and through gas spreader 48 such that increased gas atomization occurs to increase the likelihood of combustion once gas 34 comes into contact with hot surface 40.

In order to regulate when hot surface 40 arrives at a sufficient temperature for ignition, and when to begin gas flow through gas conduit 46, processor 28 receives a signal from infrared sensor 50 which is positioned to constantly monitor hot surface 40 and by reading the infrared radiation produced thereby, will send a signal to processor 28. Once hot surface 40 reaches the ignition temperature as read by infrared sensor 50, processor 28 sends a signal to gas valve 52 to allow gas 34 to flow through conduit 46, through gas spreader 48, and into contact with hot surface 40.

Once ignition of gas 34 is reached, hot surface 40 will increase in temperature, which will therefore increase the thermal radiation emitted therefrom, which in turn will be read by infrared sensor 50 and communicated to processor 28. Processor 28 will time the duration hot surface 40 is supplied power to ensure combustion, and then current flow through first conductor 42 and 44 will be stopped. However, infrared sensor 50 will then monitor the thermal radiation emitted from emission zone 58 to insure that processor 28 is constantly aware of whether combustion is occurring. In the preferred embodiment, emission zone 58 is made of a thinly machined, or coined, piece of metal, which when heated emits infrared radiation. In an alternative embodiment to increase the thermal radiation provided by emission zone 58 and thus the ability of infrared sensor 40 to detect the actual temperature within emission zone 58, a radiation coil can be provided in emission zone 58. In such an alternative embodiment of the present invention, the radiation coil can be provided in the form of a material referred to as Kanthal™ which is comprised of iron, chromium, and aluminum. While the foregoing represents a preferred material for emitting infrared radiation from within emission zone 58, those of skill in the art will readily understand that other materials are capable of emitting infrared radiation adequately for the present inventive system.

The actual heating of water tank 22 by gas system 38 occurs through convection as hot combustion gases 89 are passed through heating tube 91 provided within water tank 22. As the hot combustion gases 89 are passed through tube 91, the heat therein is dissipated into water tank 22. Cool combustion gases are then exhausted from heating tube 91 as shown in FIG. 1. Hot water is withdrawn from tank 22 as needed through outtake tube 92, while cold water is supplied to replenish tank 22 through supply tube 90.

Turning now to the electric system 62, it can be seen, as best depicted in FIG. 1, that system 62 includes an electric coil 64 adapted to be immersed into water tank 22 and by way of electric resistance heating is able to elevate the temperature of water within tank 22. It can also be seen that processor 28 is in communication with potentiometer 32 such that depending on the desired temperature of the water, as compared to the actual temperature of the water as measured by thermistor 24, processor 28 can determine whether to close electric relay 60 to thus provide power to electric coil 64 to most efficiently and quickly bring the water within tank 22 to the desired temperature.

As stated above, thermistor 24 is provided within water tank 22 or on the outside surface of water tank 22 to monitor the temperature of the water therein and transmit a signal corresponding thereto to processor 28. As is readily known by those of skill in the art, thermistor 24 has a variable resistance which varies depending on the ambient temperature within which the thermistor is disposed, with the ambient temperature in this case being the temperature of the water. The use of thermistor 24 provides the invention with an important safety feature in preventing the water from reaching an unacceptably high temperature. In the preferred embodiment, if the thermistor 24 fails in either an open or short condition, the failure will be monitored by processor 28 which in turn will cut power to relay 60 and thus power to coil 64. Relay 60 is a normally open contact such that when power is eliminated the relay opens. Similarly, processor 28 will cause valve 52 to stop the flow of gas. In so doing, the preferred embodiment of the present invention provides a safety feature to avoid scalding hot water, but without the need for an energy cut-off switch or the like.

However, as a redundant safety feature, an energy cut-off (ECO) switch can be provided in alternative embodiments such that should the water temperature within tank 22 rise above a predetermined unsafe level, energy will be shut off to processor 28 and thus in turn to the gas system 38 and electric system 62. Such a feature is commonly required by manufacturers code, so as to avoid potential scalding if such extremely hot water were to come in contact with human skin.

Referring now to FIG. 3, a flow chart is shown to depict the typical sequence of instructions and queries processed by processor 28 during the course of operation. As shown therein, the operation of system 20 is typically commenced by a user selecting the desired type of fuel as shown by step 72. As discussed above, such a selection will primarily be based upon the actual location of the vehicle and its proximity to a land based electric power system. Through step 72, a user can select either gas power, electric power, or a combination thereof. In addition to selecting the desired type of fuel source, a user can also select the desired temperature of the water through step 74. Step 74 allows the user to select the desired temperature of the water within a predetermined range, but for safety reasons prevents the desired temperature from exceeding that permitted by manufacturing code.

Once a user selects the desired fuel source and desired temperature, signals corresponding thereto are provided to processor 28 which stores the signals in appropriate registers. In addition, processor 28 receives a signal from thermistor 24 to indicate the temperature within the water tank 22. This step is represented by step 76 shown in FIG. 3. Based on these three variables, processor 28 can then determine the best manner in which to bring the temperature of the water within tank 22 up to the desired temperature. In the preferred embodiment, once the user selects the desired fuel source, processor 28 will send signals either to electric relay 60, gas valve 52, or both to bring water within tank 22 up to the desired level. Simultaneously, the processor 22 will compare the actual temperature as measured by thermistor 24 to the desired temperature as measured by potentiometer 32 and perform the analysis as shown in FIG. 3, represented by step 78. For example, if the desired temperature is equal to the desired temperature, processor 28 will cut power to electric relay 60 to disconnect coil 64 and close gas valve 52. Such calculation is shown by step 80 in FIG. 3. However, if the actual temperature as measured by thermistor 24 is less than the desired temperature, processor 28 will direct gas valve 52 to open and/or electric relay 60 to close to thereby begin heating of water tank 22 as shown by step 82. Such analysis will continuously be performed while water heater system 20 is activated. In an alternative embodiment electric system 62 and gas system 38 could be controlled by processor 28 in modulated form, wherein gas valve 52 or electric coil 64 are gradually increased or decreased, as opposed to the "on/off" system of the preferred embodiment.

It can therefore be seen that the present invention brings to the art a new and improved water heater system which allows both a gas based and electric based heating system to heat the water within a water tank, and to do so with a single temperature sensing means and a single means of temperature control. The user of such a system therefore only needs to select the desired mode of heating, and the desired water temperature, and the processor based system of the present invention then performs the appropriate calculation and control to provide an essentially transparent system to the user. Not only is the system more user friendly, but also results in a more cost effective system in that dual systems of temperature monitoring and temperature control need not be employed as have heretofore been demanded by prior art systems. Moreover, through the use of a thermistor monitored by a processor, failure of the thermistor in an open or short condition will cause the processor to shut down the water heater. This will prevent the water temperature from reaching a predetermined high level, and eliminate the need for a separate energy cut-off switch, as currently required by manufacturer's code. Furthermore, alternative embodiments can modulate the flow of gas or electric current to thereby vary or regulate the rate at which the water with the water tank is brought up to the desired temperature.

What is claimed is:

1. A recreational vehicle water heater comprising:
   a tank adapted to hold water to be heated, the tank including an inlet for receipt of cold water and an outlet for exhaust of hot water;
   electric heating means adapted to heat the water within the tank;
   gas heating means adapted to heat the water within the tank;
   user interface means enabling a user to input a desired water temperature and a desired heating means for heating the water, the user interface means adapted to generate a signal proportional to the desired water temperature and a signal proportional to the desired heating means;
   temperature measurement means adapted to measure the temperature of the water within the tank, and generate a measured temperature signal proportional thereto;
   a processor adapted to receive the desired temperature signal, the desired heating means signal, and the measured temperature signal, the processor further adapted to compare the measured temperature signal to the desired temperature signal and generate signals to activate or deactivate the electric heating means, the gas heating means, or both, depending on the desired heating means signal.

2. The recreational vehicle water heater of claim 1 wherein the electric heating means is an electrical resistance heating system immersed in the water.

3. The recreational vehicle water heater of claim 1 wherein the gas heating means includes a hot surface adapted to ignite fuel with which the hot surface comes into contact.

4. The recreational vehicle water heater of claim 3 wherein the gas heating means further includes first and second conductors electrically connected to the hot surface to cause electric current to travel through and heat the hot surface through resistance to current flow.

5. The recreational vehicle water heater of claim 4 wherein the gas heating means further includes an infrared sensor adapted to sense heat radiated by the hot surface and the processor commands fuel to be injected toward the hot surface upon the infrared radiation reaching a predetermined level.

6. The recreational vehicle water heater of claim 5 wherein the gas heating means further includes an emission means adapted to emit infrared radiation as a result of being heated, the infrared sensor adapted to monitor the infrared radiation of the emission means.

7. The recreational vehicle water heater of claim 1 wherein the temperature measurement means is a thermistor disposed within the water.

8. The recreational vehicle water heater of claim 1, wherein the temperature measurement means is a thermistor disposed on an outside surface of the water heater.

9. The recreational vehicle water heater of claim 1 wherein the user interface means includes a desired heating means switch adapted to allow a user to select a gas heat mode, an electric heat mode, and a combination mode.

10. The recreational vehicle water heater of claim 1, wherein the temperature measurement means is a thermistor and the processor is adapted to monitor the thermistor and deactivate the gas heating means and electric heating means if failure of the thermistor in an open or short condition is detected.

11. A water heater adapted to be powered either by a gas fuel source, an electric source, or a combination thereof, the water heater comprising:

a single temperature sensing device for monitoring the actual temperature of the water; and a single controller for allowing a user to select a desired water temperature, the controller adapted to direct the gas fuel source, the electric source, or a combination thereof to cause the actual water temperature to match the desired water temperature.

12. The water heater of claim 11 wherein the water heater is provided in a recreational vehicle, the gas fuel source is provided by gas stored on the recreational vehicle, and the electric source is provided by a 120 volt alternating current land-based outlet.

13. The water heater of claim 11 wherein the temperature sensing device is a thermistor disposed in the water heater.

14. The water heater of claim 11 wherein the temperature sensing device is a thermistor disposed on an outside surface of the water heater.

15. The water heater of claim 11 wherein the single controller includes a user interface module and a processor, the user interface module enabling the user to select the desired temperature and the desired power source, the processor including comparator means adapted to compare the desired water temperature to the actual water temperature and to activate the gas fuel source and the electric source to cause the desired water temperature to match the actual water temperature.

16. A method for heating a body of water on board a recreational vehicle using both an electric resistance heating mechanism and a gas flame heating mechanism, the method employing a single temperature sensor and a single controller in communication with the electric resistance and gas flame heating mechanisms, or a combination thereof, the method comprising the steps of;

entering a desired water temperature and desired source of heat;

sensing the actual water temperature;

comparing the actual water temperature to the desired water temperature;

activating heat output by the electric resistance and the gas flame heating mechanisms until the desired water temperature is equal to the measured water temperature.

17. The method of claim 16 wherein the entering step is performed by the user with an interface module enabling the user to select the desired temperature and to select between gas, electric, or a combination of heat sources.

18. The method of claim 16 wherein the sensing step is performed using a thermistor.

19. The method of claim 16 further including the step of terminating power to the gas flame and electric resistance heating mechanisms once the actual water temperature reaches an unacceptably high level.

20. The method of claim 19 wherein the electric resistance heating mechanism includes a normally-open contact adapted to create an electric circuit when closed, and wherein power to the electric resistance heating mechanism is terminated by eliminating power to the normally-open contact to thereby open the contact and eliminate power to the electric resistance heating mechanism.

* * * * *